United States Patent
He et al.

(10) Patent No.: US 12,050,456 B2
(45) Date of Patent: Jul. 30, 2024

(54) VIRTUAL SIMULATION MANUFACTURING PLATFORM BASED ON AUTOMATIC CONTROL

(71) Applicant: TIANJIN UNIVERSITY, Tianjin (CN)

(72) Inventors: Li He, Tianjin (CN); Baixue Chen, Tianjin (CN)

(73) Assignee: TIANJIN UNIVERSITY (CN)

( * ) Notice: Subject to any disclaimer, the term of this patent is extended or adjusted under 35 U.S.C. 154(b) by 323 days.

(21) Appl. No.: 17/722,570

(22) Filed: Apr. 18, 2022

(65) Prior Publication Data

US 2022/0365521 A1    Nov. 17, 2022

(51) Int. Cl.
*G05B 19/418* (2006.01)

(52) U.S. Cl.
CPC .  *G05B 19/41885* (2013.01); *G05B 19/41865* (2013.01); *G05B 19/4188* (2013.01)

(58) Field of Classification Search
CPC ............................................. G05B 19/41885
See application file for complete search history.

(56) References Cited

U.S. PATENT DOCUMENTS

| | | | | |
|---|---|---|---|---|
| 5,690,173 A | * | 11/1997 | Abdul ...................... | B09C 1/10 166/305.1 |
| 2013/0183099 A1 | * | 7/2013 | Asolekar ................... | B09C 1/08 405/128.75 |
| 2020/0239343 A1 | * | 7/2020 | Kaur Brar ................. | C02F 3/342 |

FOREIGN PATENT DOCUMENTS

| | | | | | |
|---|---|---|---|---|---|
| BR | 0213512 B1 | * | 10/2002 | | |
| CN | 110456635 A | | 11/2019 | | |
| CN | 111650834 A | * | 9/2020 | ........... | G05B 13/048 |
| CN | 112130450 A | * | 12/2020 | | |
| CN | 213092651 U | * | 4/2021 | | |
| CN | 113219917 A | * | 8/2021 | ....... | G05B 19/41865 |

OTHER PUBLICATIONS

First Notification of Office Action by China National Intellectual Property Administration, dated Jan. 26, 2022.
Notice of Allowance, by China National Intellectual Property Administration, dated Mar. 2, 2022.

\* cited by examiner

*Primary Examiner* — Suresh Suryawanshi

(57) ABSTRACT

A virtual simulation manufacturing platform based on automatic control is provided. The platform comprises an integrated control system, a process treatment system, a virtual simulation system and a signal feedback system, wherein a data end of the integrated control system is connected to a data end of the process treatment system, the data end of the process treatment system is connected to a data end of the virtual simulation system, the data end of the virtual simulation system is connected to a data end of the signal feedback system. A physical workshop during the actual production process is connected to a virtual workshop on a computer by means of a digital twinning technology, and related information such as related process parameters and device parameters are completely displayed in the virtual simulation system in the virtual simulation manufacturing platform based on automatic control.

9 Claims, 5 Drawing Sheets

VIRTUAL SIMULATION MANUFACTURING PLATFORM BASED ON AUTOMATIC CONTROL

CROSS-REFERENCE TO RELATED APPLICATIONS

This application claims priority to Chinese Application No. 202110431277.X, having a filing date of Apr. 21, 2021, the entire contents of which are hereby incorporated by reference.

FIELD

The present invention falls within the technical field of environmental engineering and related devices, and in particular relates to a technology for bioremediation of a coking contaminated sites, and specifically relates to a method for establishing a non-uniform discrimination guide type twinning model on the basis of a virtual simulation manufacturing platform based on automatic control for performing bioremediation augmentation process.

BACKGROUND

In recent years, due to the adjustment and upgrading of a national industrial structure, hundreds of thousands of industrial enterprises in China have been shut down, transferred or relocated, thus releasing a large number of polluted or potentially polluted sites, which not only pollutes regional soil and groundwater environment, but also threatens the health of residents around the plots. In 2014, the Ministry of Environmental Protection have already published (Bulletin of National General Survey of Soil Contamination), which showed that the national soil contamination exceeds the standard rate of 16.1%. Remediation and treatment of contaminated sites soil is a systematic and very complicated engineering project. Modern remediation and treatment schemes need to rely on advanced technologies and Internet technologies, and at the same time, it is necessary to connect remediation and treatment as a whole, and follow-up and supervision of remediation and contamination treatment should be done well to improve the effect of contamination treatment.

For example, the soil remediation technology disclosed in the literature [Research Progress on Remediation Technologies of Polycyclic Aromatic Hydrocarbons Contaminated Soil] has the following technical defects:

1) it is difficult to find optimal process parameters, such as low degradation rate of polycyclic aromatic hydrocarbons, high degradation difficulty, long bioremediation time and high cost;

2) the remediation of site scale is limited by field conditions; and 3) it is impossible to realize remote monitoring and real-time controlling of field production data and processing process in the workshop, and it is impossible to send production instructions to field personnels by means of a mobile terminal management and control platform.

SUMMARY

The objective of the present invention is to solve the defects, which are present in the prior art, that it is difficult to find optimal process parameters, such as low degradation rate of polycyclic aromatic hydrocarbons, high degradation difficulty, long bioremediation time and high cost; the remediation of site scale is limited by field conditions; and; it is impossible to realize remote monitoring and real-time controlling of field production data and processing process in the workshop, and it is impossible to send production instructions to field personnels by means of a mobile terminal management and control platform etc., and provides a technology for bioremediation of coking contaminated sites.

The technical solutions used in order to solve the above-mentioned technical problems are as follow:

a virtual simulation manufacturing platform based on automatic control, the platform comprises an integrated control system, a process treatment system, a virtual simulation system and a signal feedback system, wherein a data end of the integrated control system is connected to a data end of the process treatment system, the data end of the process treatment system is connected to a data end of the virtual simulation system, the data end of the virtual simulation system is connected to a data end of the signal feedback system;

and the data end of the process treatment system is bidirectionally connected to the data end of the virtual simulation system, the virtual simulation system transmitting a signal received from the process treatment system to the signal feedback system for performing measurement on a process product; the integrated control system receiving a determination result provided by the signal feedback system, and sending an indication command to the process treatment system for controlling each process flow.

The above-mentioned process treatment system comprises one or more of a pretreatment physical workshop, a bioremediation physical workshop and a water gas treatment and recovery physical workshop; and the virtual simulation system comprises one or more of a pretreatment virtual workshop, a bioremediation virtual workshop and a water gas treatment and recovery virtual workshop.

The platform further comprises a user database, the user database being used for storing the design of the process flows and a process method required according to the process flow and automation degree of the remediation of contaminated soil.

Applying the process flows and the process parameters to the corresponding physical workshop in the process treatment system; after a process is completed according to the process flows, detecting process output data of the physical workshop by using a detection robot; and transmitting the output data to the signal feedback system.

In the signal feedback system, the output data is compared with rule data in the user database to determine whether the output data is qualified; if the output data is not qualified, parameter optimization is performed on a corresponding process, and the corresponding physical workshop can be accurately positioned by means of the integrated control system, thereby providing timely and effective feedback.

A pretreatment reactor is arranged in the pretreatment physical workshop, when the pretreatment physical workshop is being used, the contaminated soil is first conveyed into the pretreatment reactor, several kinds of certain oxidants are added, concentrations of several kinds of pollutants after pretreatment are obtained by means of the detection robot, and real-time data output by the pretreatment physical workshop is the concentrations of the several kinds of pollutants.

In the bioremediation physical workshop, a bio-augmentation compost process is adopted; specifically, a qualified contaminated soil after pretreatment is conveyed from the pretreatment physical workshop to a bioreactor in the bioremediation physical workshop by using a transportation robot; the temperature, humidity and oxygen concentration thereof are configured that composting is performed by means of several kinds of concentrations of microorganisms, so as to degrade an organic matter in the contaminated soil and to obtain concentrations of several kinds of organic matters after augmented composting, wherein real-time data output by the bioremediation physical workshop is the concentrations of the several kinds of organic matters The water gas treatment and recovery physical workshop adopts a limestone-gypsum wet desulfurization technology, that is, adopts a liquid absorbent to wash flue gases, so as to absorb $SO_2$; an exhaust gas generated in the bioremediation workshop reaches the water gas treatment and recovery physical workshop; in the exhaust gas treatment and circulation system, the amount of the exhaust gas in an absorption tower, a slurry spraying amount, an oxidation air flow, a slurry density, an ambient temperature, an ambient pressure and a PH value of a circulating slurry are configured; and the discharge concentration of $SO_2$ is obtained, wherein real-time data output from the physical workshop of water gas treatment and recovery is the discharge concentration of $SO_2$.

The above-mentioned virtual simulation system transmits received workshop output data to the signal feedback system, and the signal feedback system compares the output data with the rule data in the user database to determine whether a detection result is qualified; if the detection result is not qualified, parameter optimization on the corresponding process is performed, so as to find an optimal parameter; the corresponding physical workshop is accurately positioned by means of the integrated control system, thereby providing timely and effective feedback and re-configuring the parameter on the unqualified physical workshop; and if the detection result is qualified, the next process flow is performed until all the process flows are completed.

The present invention further discloses a bioremediation augmentation method of non-uniform discrimination guide type twinning model, wherein the method comprises the following steps:

step 1: constructing a virtual simulation manufacturing platform based on automatic control, wherein the virtual simulation manufacturing platform based on automatic control is a platform disclosed in claim 3; transmitting, by the virtual simulation system, the signal received from the process treatment system to the signal feedback system for performing measurement on the process product; receiving, by the integrated control system, the determination result provided by the signal feedback system; and sending the indication command to the process treatment system for controlling each process flow;

step 2: according to the process flows and automation degree of bioremediation of the contaminated soil, designing the process flows and the process method and storing the process flows and the process method in the user database;

step 3: according to the process method designed in step 2, configuring process parameters required by each process and storing the process parameters in the user database;

step 4: applying the process parameters selected in step 3 to the corresponding physical workshop in the process treatment system; after a process is completed according to the process flows, detecting process output data of the physical workshop by using a detection robot; and transmitting the output data to the signal feedback system;

step 5: in the signal feedback system, comparing the output data with rule data in the user database to determine whether the output data is qualified; if the output data is not qualified, performing parameter optimization on a corresponding process; accurately positioning the corresponding physical workshop by means of the integrated control system, thereby providing timely and effective feedback; repeating step 3, inputting the optimized process parameters, performing a new round of process production test; and if the output data is qualified, proceeding to the next process until all the process flows are completed; and step 6, after all the process flows, that is, pretreatment, bioremediation, exhaust gas treatment and circulation are completed, measuring the process product; if the process product satisfies the requirement, that is, the degradation rate of polycyclic aromatic hydrocarbons is ≥95%, and the remediation period is shortened to ≤50 days, determining that the process product passes a test; if the process product fails to pass the test, performing parameter optimization and repeating step 5 until the process product satisfying the requirements is obtained.

In step 1, when the physical workshop and the virtual workshop are connected, a non-uniform discrimination guide type twinning model is established.

In step 1, when the physical workshop and the virtual workshop are connected, a non-uniform discrimination guide type twinning model is established, and specific operation steps thereof are as follows:

step 1, establishing a digital twinning five-dimensional model architecture, wherein the model architecture comprises five modules, which respectively are: a physical layer module, a twinning layer module, a multi-perception layer module, a database layer module and a manipulation layer module; and taking ThingWorx industrial Internet of Things platform as a system service platform to establish a virtual simulation manufacturing platform based on automatic control on the basis of digital twinning;

step 2: establishing a model; using Q0 calculated in a first frame as supervision information, and introducing a discriminative model δ that can be learned online to obtain a new scoring formula as follows:

$$f(x_i, Q_i; \theta, s) = (b(s * Q_i)) * \mu(x_i) \quad (1)$$

wherein $Q_i = \mu(z_i)$; θ is a set of parameters trained offline, which do not change during tracking; $\mu(\cdot)$ is a feature extractor trained offline; b is an activation function; s is the weight of online discrimination model δ; and * indicates the mapping obtained by means of performing a convolution operation;

step 3: calculating a KL divergence matrix $D_{kl}$ between different network parameter distributions by using the strategy of managing δj, by the KL divergence between δj network parameters Sj of the discriminative model obtained at different times, as shown in the following formula:

$$D_{kl}^{(m,n)}(P(s_m) | P(s_n)) = \sum_{i=1}^{N} P(x_i) \log\left(\frac{P(x_i)}{q(x_i)}\right) \quad (2)$$

$P(s_m), P(s_n) \in R_{1 \times N}$ are corresponding probability distribution of $s_m$ and $s_n$; (m, n) indicates the element at the m-th row and the n-th column in $D_{kl}$;

step 4: for a new $\delta_t$ obtained in each frame, calculating a KL divergence vector dt with an existing networks thereof; finding $\delta_k$, k∈ a corresponding to the minimum KL divergence distance, and a distance $d_t(m)$ thereof, and using the strategy f shown in formula (3) to update a discriminative module;

$$f = \begin{cases} V(k) = \delta_i, & \text{if } d_t(i) > \min(D_{kl}) \\ \text{none}, & \text{others} \end{cases} \quad (3)$$

$V_i$ is a score response diagram of the current moment i; allowing $\widehat{Qi} = \delta(Qi) = b(s*Qi)$, a loss function of similarity calculation for online updating is constructed as shown in formula (4):

$$Lup(s) = \sum_{j=i-n}^{i} \gamma_j(\widehat{Q_i} - Q_0)^2 + \lambda \|s\|_2 \quad (4)$$

$\|\cdot\|_2$ is L2 norm, regularizing the weight s of a neural network; $\lambda$ is a regularization coefficient; and n is the number of samples;

$$\gamma_j = \frac{1}{E}\beta^{i-j}, E = \sum_{j=i-n}^{i} \beta^{i-j}$$

indicates the jth sample weight; and $0<\alpha<1$ indicates an attenuation parameter of the sample weight; and step 5: designing an online update strategy, wherein the objective of optimization is to find a suitable $\Delta s$ to minimize $\widehat{L_{up}}(s)$.

Compared with the prior art, the present invention has the following technical effects.

1) according to the present invention, a physical workshop during the actual production process is connected to a virtual workshop on a computer by means of a digital twinning technology, and in the virtual simulation manufacturing platform based on automatic control, related information such as related process parameters and device parameters are completely displayed in the virtual simulation system. The virtual simulation manufacturing platform based on automatic control has powerful functions of sorting, classifying and analyzing these data, a manager can remotely monitor and control the process flows at any time in an intuitive and immersive way, and optimize feedback by means of the integrated control system, so as to meet the demand for production data in all directions, and realize real-time monitoring of field production data in the workshop, monitoring and managing and controlling of the processing process, optimizing feedback adjustment, and sending production instructions to the field personnels by means of the mobile terminal control platform, ensuring that a production site is always in a controllable state, enhancing the decision-making and control capabilities at all levels in a production process, and realizing "virtual control over reality".

2) The present patent proposes a new discriminative tracking method: non-uniform discrimination guide type twinning model, and at the same time, a second-order optimization method is used to update the model, so as to realize faster convergence by means of fewer number of iterations.

3) the user constructs a multi-element coupling remediation process of "pretreatment-bioremediation-exhaust gas biofiltration-water and gas cyclic utilization" in the virtual simulation manufacturing platform based on automatic control by means of using the present invention. Realize the intelligent running of pollutant coupling degradation process, such that the contaminated soil can be remediated and the waste water and the exhaust gas can be discharged up to the standard. By means of continuous parameter optimization, the optimal process parameters are obtained, the production efficiency of process products is maximized, the precise matching of pretreatment and bioremediation time is achieved, and the process running cost is the lowest. It has certain intelligence and practicality, which can reduce costs and improve production efficiency.

BRIEF DESCRIPTION OF THE DRAWINGS

The present invention will be further described below in conjunction with the accompanying drawings and embodiments.

DETAILED DESCRIPTION

Figure 1:
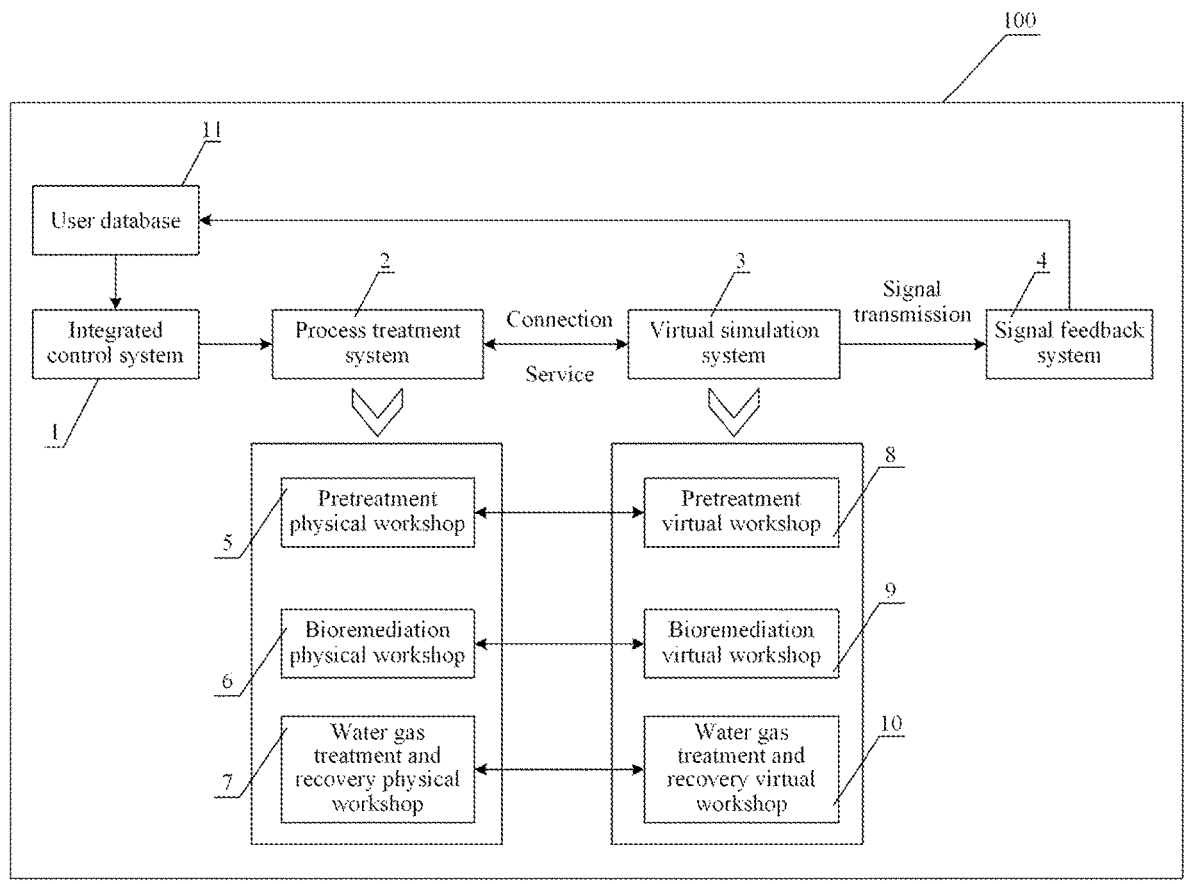
FIG. 1 is a schematic structural diagram of the present invention.

As shown in FIG. 1, a virtual simulation manufacturing platform based on automatic control 100, the platform comprises an integrated control system 1, a process treatment system 2, a virtual simulation system 3 and a signal feedback system 4, wherein a data end of the integrated control system 1 is connected to a data end of the process treatment system 2, the data end of the process treatment system 2 is connected to a data end of the virtual simulation system 3, the data end of the virtual simulation system 3 is connected to a data end of the signal feedback system 4.

The data end of the process treatment system 2 is bidirectionally connected to the data end of the virtual simulation system 3, the virtual simulation system 3 transmitting a signal received from the process treatment system 2 to the signal feedback system 4 for performing measurement on a process product; the integrated control system 1 receiving a determination result provided by the signal feedback system 4, and sending an indication command to the process treatment system 2 for controlling each process flow.

The process treatment system 2 comprises one or more of a pretreatment physical workshop 5, a bioremediation physical workshop 6 and a water gas treatment and recovery physical workshop 7; and the virtual simulation system 3 comprises one or more of a pretreatment virtual workshop 8, a bioremediation virtual workshop 9 and a water gas treatment and recovery virtual workshop 10.

The platform further comprises a user database 11, the user database 11 being used for storing the design of the process flows and a process method required according to the process flow and automation degree of the remediation of contaminated soil.

Applying the process flows and the process parameters to the corresponding physical workshop in the process treatment system 2; after a process is completed according to the process flows, detecting process output data of the physical workshop by using a detection robot; and transmitting the output data to the signal feedback system 4.

In the signal feedback system 4, the output data is compared with rule data in the user database 11 to determine whether the output data is qualified; if the output data is not qualified, parameter optimization is performed on a corresponding process, and the corresponding physical workshop can be accurately positioned by means of the integrated control system 1, thereby providing timely and effective feedback.

A pretreatment reactor is arranged in the pretreatment physical workshop 5, when the pretreatment physical workshop is being used, the contaminated soil is first conveyed into the pretreatment reactor, several kinds of certain oxidants are added, concentrations of several kinds of pollutants after pretreatment are obtained by means of the detection robot, and real-time data output by the pretreatment physical workshop is the concentrations of the several kinds of pollutants.

In the bioremediation physical workshop 6, a bio-augmentation compost process is adopted; specifically, a qualified contaminated soil after pretreatment is conveyed from the pretreatment workshop to a bioreactor in the bioremediation physical workshop by using a transportation robot; the temperature, humidity and oxygen concentration thereof are configured that composting is performed by means of several kinds of concentrations of microorganisms, so as to degrade an organic matter in the contaminated soil and to obtain concentrations of several kinds of organic matters after augmented composting, wherein real-time data output by the bioremediation physical workshop is the concentrations of the several kinds of organic matters.

The water gas treatment and recovery physical workshop 7 adopts a limestone-gypsum wet desulfurization technology, that is, adopts a liquid absorbent to wash flue gases, so as to absorb $SO_2$; an exhaust gas generated in the bioremediation workshop reaches the water gas treatment and recovery physical workshop; in the exhaust gas treatment and circulation system, the amount of the exhaust gas in an absorption tower, a slurry spraying amount, an oxidation air flow, a slurry density, an ambient temperature, an ambient pressure and a PH value of a circulating slurry are configured; and the discharge concentration of $SO_2$ is obtained, wherein real-time data output from the physical workshop of water gas treatment and recovery is the discharge concentration of $SO_2$.

The above-mentioned virtual simulation system 3 transmits received workshop output data to the signal feedback system, and the signal feedback system 4 compares the output data with the rule data in the user database to determine whether a detection result is qualified; if the detection result is not qualified, parameter optimization on the corresponding process is performed, so as to find an optimal parameter; the corresponding physical workshop is accurately positioned by means of the integrated control system, thereby providing timely and effective feedback and re-configuring the parameter on the unqualified physical workshop; and if the detection result is qualified, the next process flow is performed until all the process flows are completed.

The above-mentioned integrated control system 1 can choose a PLC; the model of which is Siemens S7-400, wherein Siemens S7-400 PLC is a programmable controller for medium and high performance range. Siemens S7-400 PLC adopts modular fanless design, which is reliable and durable. At the same time, it can choose various levels of CPU, and is equipped with various templates with general functions, such that the user can combine different special systems according to requirements. When the scale of the control system is expanded or upgraded, only some templates need to be added appropriately, such that the system can be upgraded and fully meet the needs.

Figure 3:
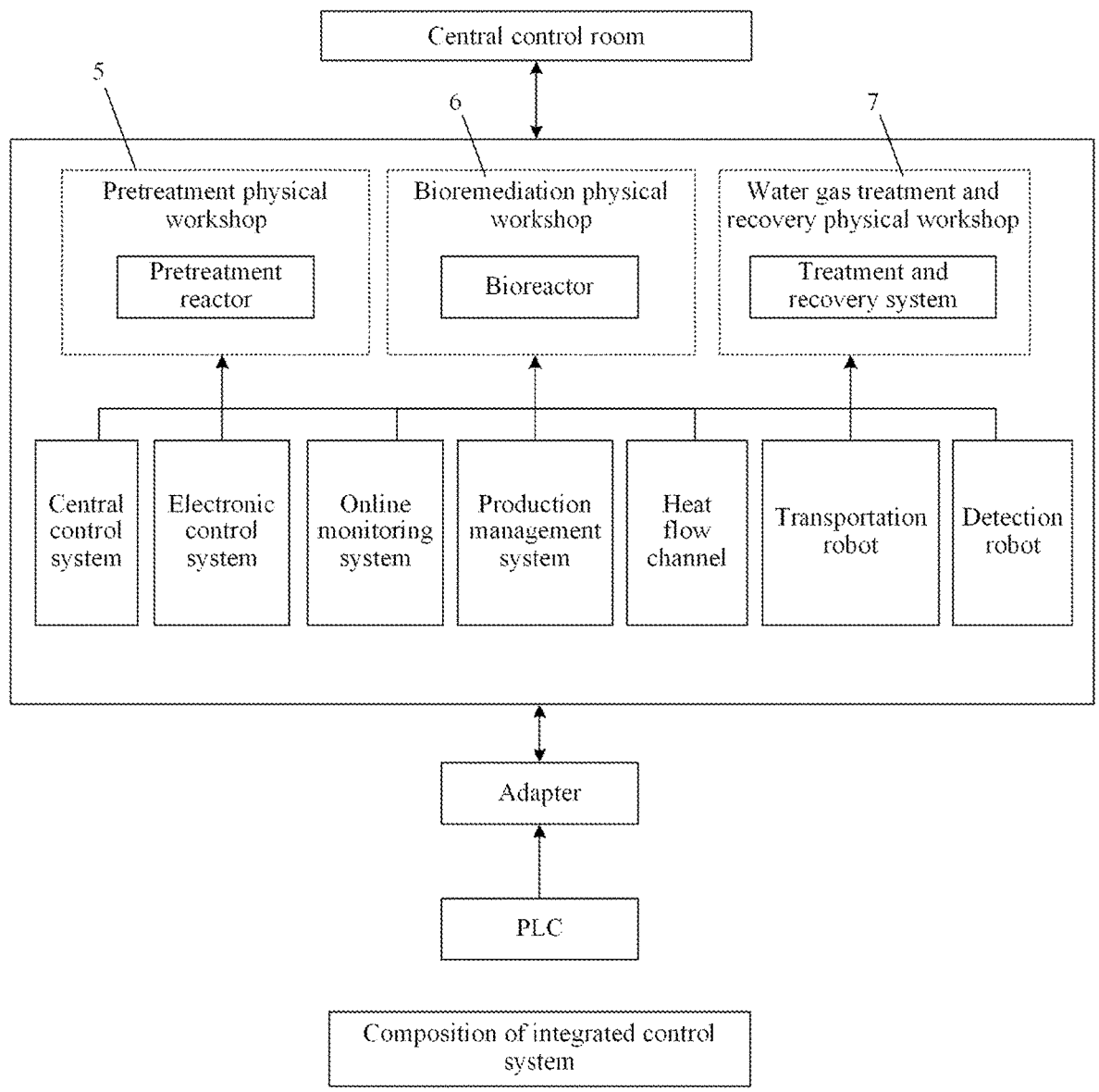
FIG. 3 is a control system diagram of the integrated control system of the present invention for each physical workshop.

The above-mentioned integrated control system 1 controls each physical workshop as shown in FIG. 3. The integrated control system 1 (the PLC of Siemens S7-400) is composed of a production system and a non-production system. The production system is mainly composed of parts such as a heat flow channel, a transportation robot, a detection robot, an adapter, a PLC. The non-production system is mainly composed of parts such as a central control system, an electric control system, an online monitoring system, a production management system. The central control room is responsible for processing a large amount of information from the production system and the non-production system. By means of a PLC integrated control system, three physical workshops of process treatment system (pretreatment physical workshop 5, bioremediation physical workshop 6, water gas treatment and recovery physical workshop 7), three virtual workshops of virtual simulation system and a signal feedback system are connected into an inseparable whole, thus making the best use of information resources.

Figure 2:
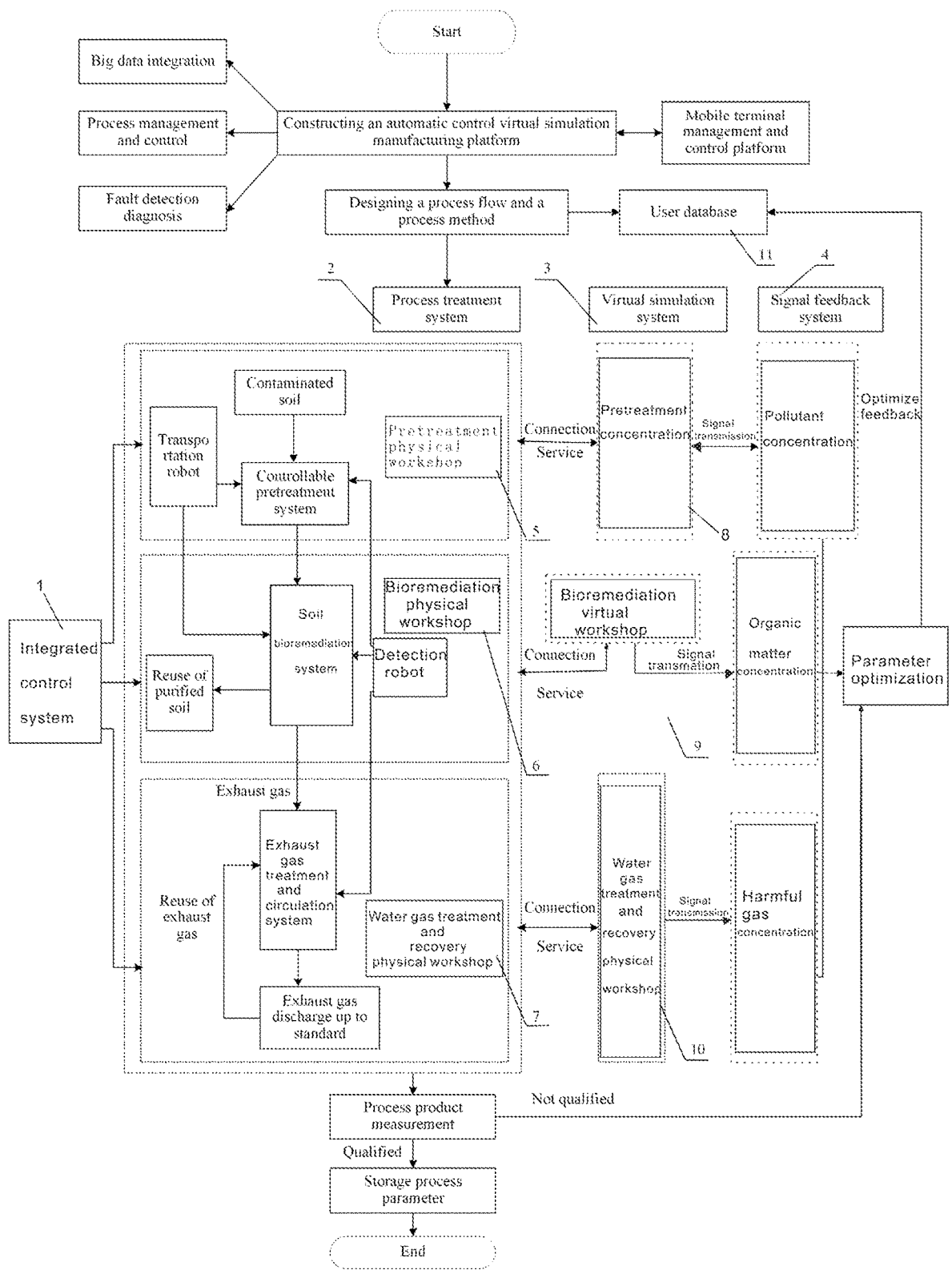
FIG. 2 is a flowchart of the method of the present invention.

As shown in FIG. 2, a method for bioremediation augmentation by using the above-mentioned virtual simulation manufacturing platform based on automatic control 100 comprises the following steps.

step 1: constructing a virtual simulation manufacturing platform based on automatic control, wherein the virtual simulation manufacturing platform based on automatic control is a platform in claim 2; transmitting, by the virtual simulation system, the signal received from the process treatment system to the signal feedback system for performing measurement on the process product; receiving, by the integrated control system, the determination result provided by the signal feedback system; and sending the indication command to the process treatment system for controlling each process flow.

step 2: according to the process flows and automation degree of bioremediation of the contaminated soil, designing the process flows and the process method and storing the process flows and the process method in the user database.

step 3: according to the process method designed in step 2, configuring process parameters required by each process and storing the process parameters in the user database.

step 4: applying the process parameters selected in step 3 to the corresponding physical workshop in the process treatment system; after a process is completed according to the process flows, detecting process output data of the physical workshop by using a detection robot; and transmitting the output data to the signal feedback system.

step 5: in the signal feedback system, comparing the output data with rule data in the user database to determine whether the output data is qualified; if the output data is not qualified, performing parameter optimization on a corresponding process; accurately positioning the corresponding physical workshop by means of the integrated control system, thereby providing timely and effective feedback; repeating step 3, inputting the optimized process parameters, performing a new round of process production test; and if the output data is qualified, proceeding to the next process until all the process flows are completed.

step 6, after all the process flows, that is, pretreatment, bioremediation, exhaust gas treatment and circulation are completed, measuring the process product; if the process product satisfies the requirement, determining that the process product passes a test, and finishing the process; if the process product fails to pass the test, performing parameter optimization and repeating step 5 until the process product satisfying the requirements is obtained.

In step 1, when the physical workshop and the virtual workshop are connected, a non-uniform discrimination guide type twinning model is established.

The specific method of the step 1 is: on the basis of digital twinning, performing management on the full life cycle on the bioremediation augmentation process of coking contaminated sites, performing related activities, such as data collection, data processing, finding effective information, by means of the simulation and the emulation of the model, optimizing the design in real time, making a production decision, the early warning running and maintenance in real time. In the full life cycle of production, the static information management to the real-time and effective dynamic information interaction is realized.

Figure 5:
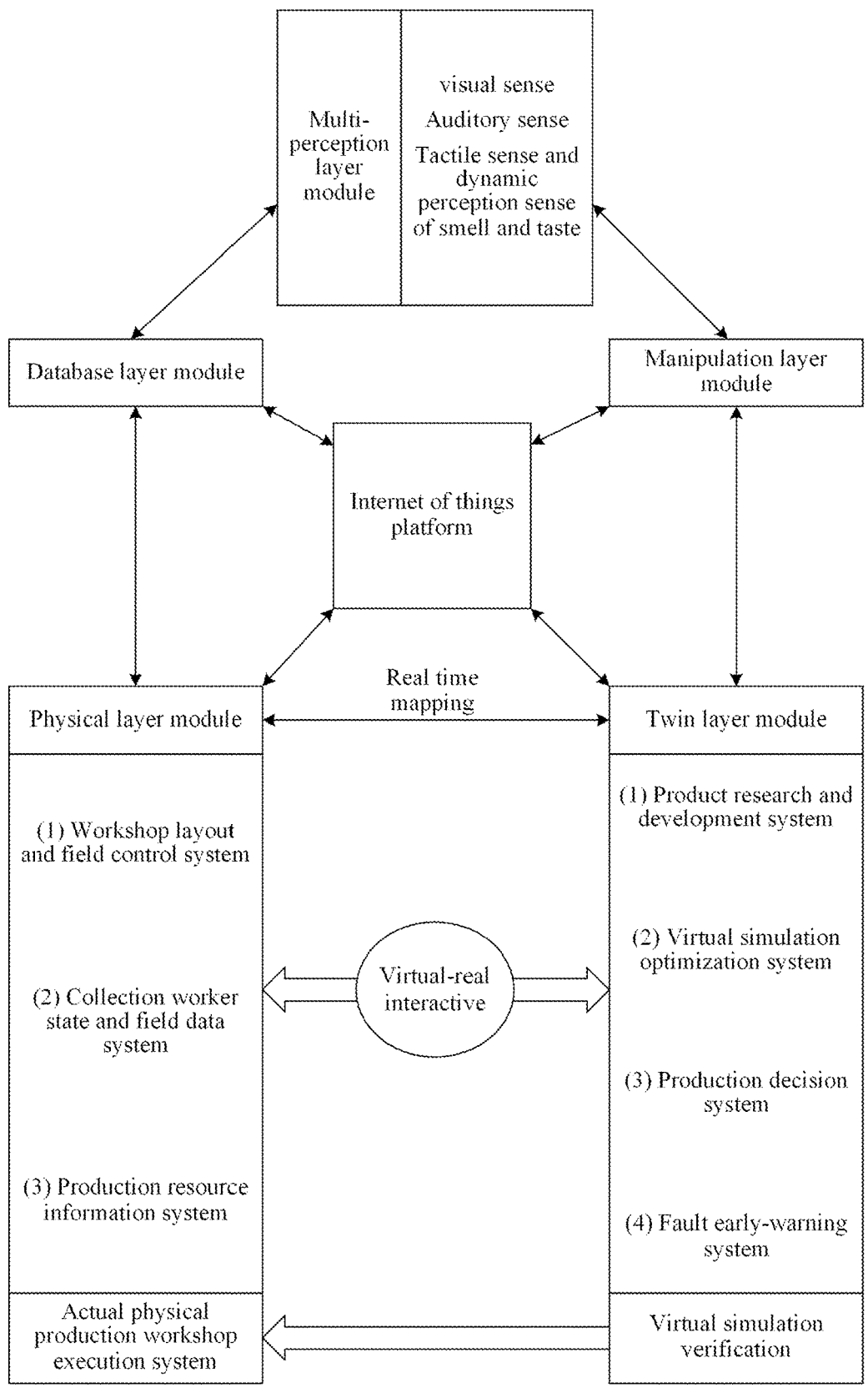
FIG. 5 is a digital twinning five-dimensional model architecture diagram related to the present invention.

A digital twinning five-dimensional model architecture is adopted, as shown in FIG. 5, wherein the model architecture comprises five modules, which respectively are: a physical layer module, a twinning layer module, a multi-perception layer module, a database layer module and a manipulation layer module. Combining the powerful data integration and system integration capabilities of the industrial Internet of Things platform and taking ThingWorx industrial Internet of Things platform as a system service platform to establish a virtual simulation manufacturing platform based on automatic control on the basis of digital twinning.

The physical layer module comprises a workshop layout and field control system, a collection worker state and field data system, and a production resource information system. The twinning layer module comprises a product research and development system, a virtual simulation optimization system, and a fault early-warning system.

The main process of geometric model construction of the virtual workshop in twinning layer module is the following three steps.

(1) establishing the model of physical workshop elements, which contains establishment of element level management, geometric model establishment, optimization and rendering of elements. This part of work is mainly completed by means of a 3DMAX software.

(2) building the environmental elements of the virtual workshop, and placing the geometric model of the processed elements into the virtual workshop environment in an ordered manner. This part of work is mainly completed by means of a Unity software.

(3) The model driving based on physical workshop data is realized by means of a script technology. The softwares mainly used in the whole process comprise the 3DMAX software and the Unity software.

The database layer module mainly stores all kinds of data, comprising attribute data of physical elements such as devices, plants and lights in the physical workshop, dynamic process data that can reflect running state thereof, and data related to a representation model in the virtual workshop (comprising a geometric model, a physical model, a behavior model and a rule model, etc.); expert knowledge, industry standards, common algorithms, common databases and common API interfaces.

The multi-perception layer module: is used for real-time collecting and data pre-processing of heterogeneous multi-source data in the workshop, comprising visual sense, auditory sense, tactile sense and dynamic perception, sense of smell and taste. In order to realize the mapping of real physical entities and effectively reflect the information flow corresponding to the full life cycle, the model needs to be decomposed into several kinds of components. The system adopts OPCUA Server-based acquisition mode, and the interface of target information data is acquired from the database or terminals such as a PLC, a sensor and an industrial control computer in manufacturing field by means of a multi-perception layer.

The manipulation layer module realizes multi-level monitoring by means of constructing a three-dimensional virtual scene, a state kanban, a real-time video and augmented reality. On the basis of the virtual workshop driven by real-time data, the three-dimensional visual navigation of manufacturing resources in the workshop, the simulation and real-time monitoring of physical movements in the workshop are realized, the transparent production of the workshop, the recurrence and simulation of fault problems are realized, and requirements of users, such as traceability analysis, real-time monitoring and predictive simulation of the workshop are met.

Because of the non-uniform characteristics of twinning network trackers, the targets with the same semantic features can be effectively suppressed, and at the same time, the problem of target deformation during tracking can be relieved. The tracker has weak discrimination ability for similar targets, therefore the present patent adopts a non-uniform discrimination guide type twinning model, which is a new discriminative tracking method. At the same time, a second-order optimization method is used to update the model, so as to realize faster convergence by means of fewer number of iterations.

Specifically, in step 1, when the physical workshop and the virtual workshop are connected, a non-uniform discrimination guide type twinning model is established, and specific operation steps thereof are as follows.

step 1, establishing a digital twinning five-dimensional model architecture, wherein the model architecture comprises five modules, which respectively are: a physical layer module, a twinning layer module, a multi-perception layer module, a database layer module and a manipulation layer module; combining the powerful data integration and system integration capabilities of the industrial Internet of Things platform and taking ThingWorx industrial Internet of Things platform as a system service platform to establish a virtual simulation manufacturing platform based on automatic control on the basis of digital twinning.

step 2: establishing a model, in order to solve the deviation on an error of the size of a target obtained by tracking due to the deformation of a target and the existence of certain noise during the process of tracking of the tracker and the tracking results may have errors in the tracking position, these errors will gradually accumulate with time i, and the filter $Q_i$ of a tracking target will be polluted, resulting in the problem that the tracker cannot find the target. The $Q_0$ calculated in a first frame is used as the supervision information, and a discriminative model δ that can be learned online is introduced, the new scoring formula is as follows:

$$f(x_i, Q_i; \theta, s) = (b(s * Q_i)) * \mu(x_i) \tag{1}$$

$Q_i = \mu(z_i)$;

θ: a set of parameters trained off-line, which do not change during tracking

μ(·): a feature extractor trained offline b: an activation function, and s: the weight of online discrimination model δ, * indicates the mapping obtained by means of a convolution operation.

step 3: with the increase of time i, the difference between the same targets in different frames will become bigger, calculating a KL divergence matrix $D_{kl}$ between different network parameter distributions by using the strategy of managing δj, by the KL divergence between δj network parameters Sj of the discriminative model obtained at different times, as shown in the following formula:

$$D_{kl}^{(m,n)}(P(s_m) | P(s_n)) = \sum_{i=1}^{N} P(x_i)\log\left(\frac{P(x_i)}{q(x_i)}\right) \quad (2)$$

$P(s_m), P(s_n) \in R_{1 \times N}$ are corresponding probability distribution of $s_m$ and $s_n$ (m, n): the element at the m-th row and the n-th column in $D_{kl}$.

step 4: for a new $\delta_i$ obtained in each frame, calculating a KL divergence vector dt with an existing networks thereof; finding $\delta_k$, k∈ a corresponding to the minimum KL divergence distance, and a distance $d_i(m)$ thereof, using the strategy f shown in formula (3) to update a discriminative module;

$$f = \begin{cases} V(k) = \delta_i, & \text{if } d_t(i) > \min(D_{kl}) \\ \text{none, others} \end{cases} \quad (3)$$

Vi: a score response diagram of the current moment i;

Allowing $\widehat{Qi} = \delta(Qi) = b(s*Qi)$, a loss function of similarity calculation for online updating is constructed as shown in formula (4):

$$Lup(s) = \sum_{j=i-n}^{i} \gamma_j(\hat{Q}_j - Q_0)^2 + \lambda\|s\|_2 \quad (4)$$

$\|\cdot\|_2$: L2 norm, regularizing the weight s of a neural network;
λ: a regularization coefficient;
and n: the number of samples;

$$\gamma_j = \frac{1}{E}\beta^{i-j}, E = \sum_{j=i-n}^{i} \beta^{i-j}$$

indicates the jth sample weight;
and 0<α<1: an attenuation parameter of the sample weight.

step 5, designing an online update strategy, wherein the objective of optimization is to find a suitable Δs to minimize $\widehat{L_{up}}(s)$. The specific optimization algorithm is as follows:

step 1 initializing the network weight s, a residual error r (s), TCG, T;

step 2, for i=1, . . . , T do.

step 3, calculating ∇Lup(s) under s, HSV=RV {s(s)}, and substitute into formula (6), Δs←0;

step 4, for j=1, . . . , TCG, ΔS=ΔS₀, $d_i=d_0=-\nabla Lup(S)$ do;

step 5, calculating a step length: calculating β to minimize formula (6);

$$\beta = -\frac{d_j^T(H_s \Delta S + b)}{d_j^T H_s d_j}$$

step 6, updating the weight: Δs=Δs+βdj;

step 7, updating an orientation: Letdj+1=−∇Lup(Δs)+ξ_j d_j, wherein;

$$\xi_j = \frac{\nabla L_{up}(\Delta s)^T H_s d_j}{d_j^T H_s d_j}$$

step 8 end for;

step 9 s=s+Δs; and step 10 end for.

Because there are few parameters and samples to be learnt, in order to ensure the speed and accuracy, the above-mentioned approximate second-order optimization algorithm is adopted. In order to simplify the calculation form, the residual is defined as: $r_j(s)=\sqrt{r_j}(\widehat{Q_j}-Q_0), r_{n+1}=\sqrt{\lambda}s$, $r_j(s)$ and $r_{n+1}$ are spliced to constitute r(s) according to formula (4). At this time, the formula (4) can be equivalent to $$L_{up}(s) = \mu r(s) \mu^2 \quad (5)$$

Vi: a score response diagram of the current moment i;

$\delta_j$: the discriminative model obtained at different times performing the second-order Taylor expansion of formula (8), and there are:

$$L_{up}(s) \approx L_{up}(s + \Delta s) = L_{up}(s) + \frac{\partial L_{up}(s)}{\partial s}\Delta s + \frac{1}{2}\Delta s^T \frac{\partial^2 L_{up}(s)}{\partial s^2}\Delta s + O(\|\Delta s\|^2) = \quad (6)$$
$$r_s^T r_s + 2\Delta s^T \nabla^T r_s + \Delta s^T H_s \Delta s + O(\|\Delta s\|^2)$$

$$\nabla T = \frac{\partial L_{up}}{\partial s}$$

Hs: a Hessian matrix $O(\|\Delta s\|^2)$: extremely small amount, and can be ignored The algorithm proposed in the present patent not only makes use of the sample image $x_i$ at a moment i, but also ensures that the filter $Q_i$ obtained by $x_i$ will not deviate too much from the real filter $Q_0$. Since there is a small gap between filter $\delta(\mu(z_i))$ and $Q_0$, and at the same time $\delta(\mu(z_i))$ further contains information of the target at the moment i, such a filter has higher discrimination when facing the same kind of target.

Figure 4:
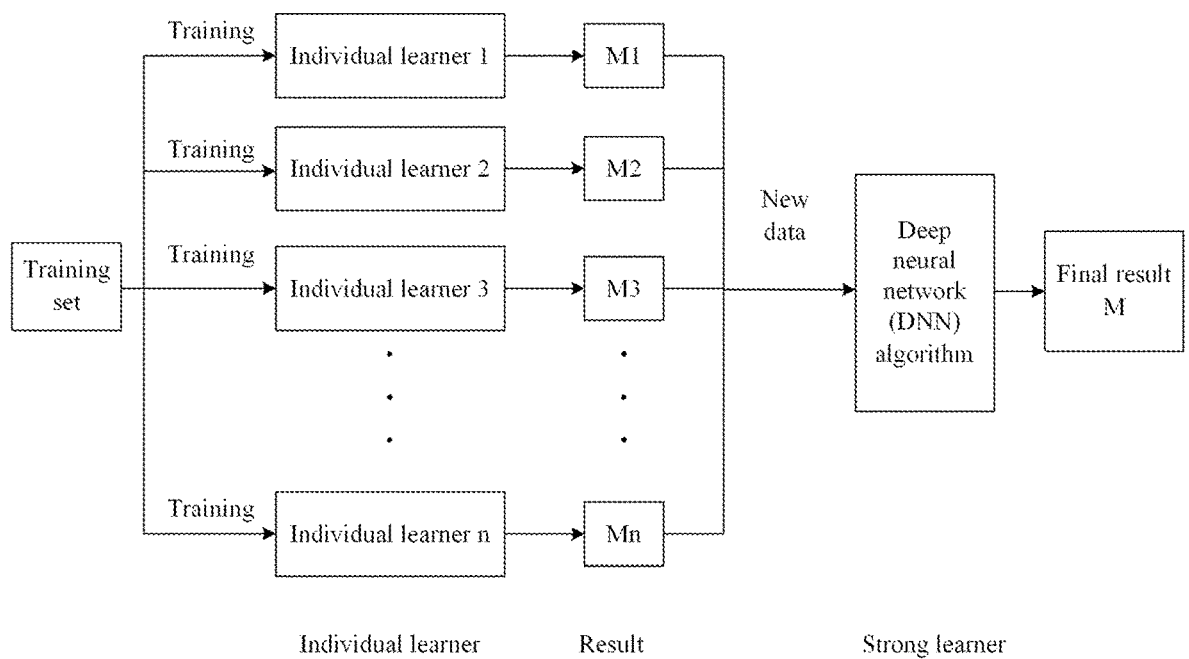
FIG. 4 is an integrated learning predictor in parameter optimization related to the present invention.

Furthermore, with regard to the three physical workshops of the process treatment system, the integrated learning predictor shown in FIG. 4 is adopted to train a large number of input and output data pairs measured in the experiment, and a stable network output is obtained, such that the total error between the actual output and the ideal output is less than the allowable value. In this way, after the network training is completed, the integrated learning predictor can be used to make online prediction of the required output of the system.

As shown in FIG. 4, the first-level individual learners of the integrated learning predictor are several weak learners. In this implementation case, five algorithms are selected: random forest, logistic regression algorithm, support vector machine, naive Bayes, and k-nearest neighbor algorithm. The combination strategy adopted is stacking, which integrates the above five individual learners into a strong learner. The strong learner selects a deep neural network algorithm. With regard to the test set, the first-level learner is used to predict once to obtain an input sample of the second-level learner, that is, the strong learner, and then the strong learner is used to predict once to obtain a final prediction result. According to the prediction result, select an appropriate optimization algorithm to optimize and solving optimal parameters.

With regard to the pretreatment physical workshop, input amounts of the integrated learning predictor comprise an indexes (the concentration of a kinds of pollutants, which is denoted as a-dimensional vector M) and b controllable variables (the charging amount of b kinds of oxidants, which is denoted as b-dimensional vector K), and the output amount is the concentration of a kinds of pollutants after pretreatment (which is denoted as a-dimensional vector N). The relational expression can be expressed as: F (M, K)=N.

The above-mentioned integrated learning predictor is adopted for performing prediction, and the output N(t+Δt) of the system at a moment t+Δt is predicted according to the input signals M(t) and K(t) and the output signal N (t) at a moment t. According to the prediction result, an appropriate optimization algorithm is selected, and an optimal oxidant added volume is found by means of repeated trial calculation of oxidant added volume, such that the total running cost is made to be the minimum under the condition of meeting the requirements of pollutant concentration. The optimization targets are:

$$\min P = W^T KS + L$$

$$s.t. \begin{cases} N = F(M, K) \le Q_0 \\ 0 \le K_i \le Y_i (i = 1, 2, \cdots, b) \end{cases}$$

in the formula:
P: total cost, yuan; M: a-order vector, the initial concentration of a kinds of pollutants in soil, mol/m3; N: a-order vector, the concentration of a kinds of pollutants in the pretreated soil, mol/m3; K: b-order vector, which is the added volume of various oxidants, L/m3; W: b-order vector, which is the price of various oxidants, yuan/L; Q0: a-order vector, which is the allowable soil content of a kinds of pollutants, mol/m3; S: volume of remediation soil, m3; Yi: the maximum allowable added volume concentration of the ith oxidant per unit time, L/(m3*h); T: transposition; and L: other fixed expenses, RMB.

With regard to the bioremediation physical workshop, the input amounts of the integrated learning predictor are temperature T, humidity M, oxygen concentration O, and n kinds of microbial concentrations H; the output amounts thereof are m kinds of organic matter concentration S and compost reaction rate J. The above-mentioned integrated learning predictor is adopted for performing prediction. According to the prediction result, an appropriate optimization algorithm is selected for continuous trial calculation. Under the condition of maximum compost reaction rate, the optimal process parameters required for composting are sought: temperature, humidity, oxygen concentration and n kinds of microbial concentrations. The optimization targets are:

$$\max J = F(T, M, O, H)$$

$$s.t. \begin{cases} T_{min} \le T \le T_{max} \\ M_{min} \le M \le M_{max} \\ O_{min} \le O \le O_{max} \\ H_{min} \le H \le H_{max} \\ 0 \le S_i \le C_0 (i = 1, 2, \cdots, m) \end{cases}$$

in the formula:
J: compost reaction rate; T: compost temperature, °C.; $T_{min}$: minimum allowable compost temperature, °C.; $T_{max}$: maximum allowable compost temperature, °C.; M: compost humidity, %; $M_{min}$: minimum allowable compost humidity, %; $M_{max}$: maximum allowable compost humidity, %; O: oxygen concentration, mol/m3; $O_{min}$: minimum allowable oxygen concentration, mol/m3; $O_{max}$: maximum allowable oxygen concentration, mol/m3; H: n-order vector, concentration of n kinds of microorganisms, mol/m3; $H_{min}$: n-order vector, minimum allowable concentration of n kinds of microorganisms, mol/m3; $H_{max}$: n-order vector, the maximum allowable concentration of n kinds of microorganisms, mol/m3; S: m-order vector, which is the concentration of m kinds of organic matter, mol/m3; $C_0$: m-order vector, which is the allowable soil concentration of M kinds of organic matter, mol/m3.

With regard to the water gas treatment and recovery physical workshop, the input amounts of the integrated learning predictor are exhaust gas volume f1, a slurry spray volume f2, an oxidation air flow f3, a slurry density f4, an ambient temperature f5, an ambient pressure f6, and a PH value f7 of a circulating slurry; the output amounts thereof are SO2 discharge concentration y1, gypsum emission rate y2, slurry pool PH y3, outlet gas flow y4, outlet gas pressure y5 and outlet gas temperature y6. The above-mentioned integrated learning predictor is adopted for performing prediction, and according to the prediction result, an appropriate optimization algorithm is selected for continuous trial calculation, so as to maximize the benefit of the desulfurization system, that is, minimize the energy consumption; and the yield of by-product gypsum is maximum, the optimal process parameters are sought: exhaust gas volume, slurry spray volume, oxidation air flow rate, slurry density, ambient temperature, ambient pressure, and PH value of circulating slurry.

The optimization targets:

$$\min J = \sum_{i=1}^{p} q_i [w(t+i) - y(t+i)]^2 + \sum_{j=1}^{M} r_j \Delta u^2 (t+j)$$

$$s.t. \begin{cases} y_1 \le y_{1max} \\ y_2 \ge y_{2min} \\ f_{imin} \le f_i(t+i) \le f_{imax}(i = 1, 2, \cdots, P) \\ y_{imin} \le y_i(t+i) \le y_{imax}(i = 3, \cdots, P)) \\ |\Delta u(t+j)| \le \Delta u_{max}(j = 1, 2, \cdots, M) \\ \Delta u(t+j) = 0(j > M - 1) \end{cases}$$

in the formula:
J: energy consumption; p: p outputs; M: M input variables; $q_i$, $r_j$ weighting coefficient, indicating the degree of inhibition of input variables;

W(t+i): set value, determined by the system (i=1, 2, ..., P);

y(t+i): output value (i=1, 2, ..., p);

$\Delta u(t+j)$: the increment of the input variable;

$\Delta u_{max}$: the maximum incremental allowable value of the input variable;

$y_1$: $SO_2$ discharge concentration, mg/m3;

$y_{1max}$: $SO_2$ discharge concentration assessment limiting value, mg/m3;

$y_2$: gypsum emission rate, m3/h;

$y_{2min}$: the minimum emission rate of gypsum, m3/h;

$f_i(t+i)$: the ith variable (i=1, 2, ..., P);

$f_{i\ min}$: the minimum allowable value of the ith variable (i=1, 2, ..., P);

$f_{i\ max}$: the maximum allowable value of the ith variable (i=1, 2, ..., p);

$y_{i(t+i)}$: the ith output (i=3 ... p);

$y_{i\ min}$: the minimum allowable value of the ith output (i=3, ..., p);

$y_{i\ max}$: the maximum allowable value of the ith output (i=3, ..., p);

after all the process flows, that is, pretreatment, bioremediation, exhaust gas treatment and circulation are completed, measuring the process product; if the process product satisfies the requirement, that is the degradation rate of polycyclic aromatic hydrocarbons is ≥95%, and the remediation period is shortened to ≤50 days, determining that the process product passes a test, process parameters are stored, if the process product fails to pass the test, performing parameter optimization and repeating the above-mentioned step until the process product satisfying the requirements is obtained.

What is claimed is:

1. A virtual simulation manufacturing platform based on automatic control, comprising an integrated control system (1), a process treatment system (2), a virtual simulation system (3) and a signal feedback system (4), wherein a data end of the integrated control system (1) is connected to a data end of the process treatment system (2), the data end of the process treatment system (2) is connected to a data end of the virtual simulation system (3), the data end of the virtual simulation system (3) is connected to a data end of the signal feedback system (4);

and the data end of the process treatment system (2) is bidirectionally connected to the data end of the virtual simulation system (3), the virtual simulation system (3) transmitting a signal received from the process treatment system (2) to the signal feedback system (4) for performing measurement on a process product; the integrated control system (1) receiving a determination result provided by the signal feedback system (4), and sending an indication command to the process treatment system (2) for controlling each process flow.

2. The virtual simulation manufacturing platform based on automatic control according to claim 1, wherein, the process treatment system (2) comprises one or more selected from among a pretreatment physical workshop (5), a bioremediation physical workshop (6) and a water gas treatment and recovery physical workshop (7); and the virtual simulation system (3) comprises one or more selected from among a pretreatment virtual workshop (8), a bioremediation virtual workshop (9) and a water gas treatment and recovery virtual workshop (10).

3. The virtual simulation manufacturing platform based on automatic control according to claim 2, wherein, the platform further comprises a user database (11) for storing a design of process flows and a process method required according to a process flow and automation degree of a remediation of contaminated soil.

4. The virtual simulation manufacturing platform based on automatic control according to claim 3, wherein, the process flows and process parameters are applied to a corresponding physical workshop in the process treatment system (2); after a process is completed according to the process flows, process output data of the physical workshop is detected by using a detection robot; and the output data is transmitted to the signal feedback system (4).

5. The virtual simulation manufacturing platform based on automatic control according to claim 4, wherein, in the signal feedback system (4), the output data is compared with rule data in the user database (11) to determine whether the output data is qualified; if the output data is not qualified, parameter optimization is performed on a corresponding process, and the corresponding physical workshop can be accurately positioned by means of the integrated control system (1), thereby providing timely and effective feedback.

6. The virtual simulation manufacturing platform based on automatic control according to claim 2, wherein, a pretreatment reactor is arranged in the pretreatment physical workshop (5), when the pretreatment physical workshop is being used, contaminated soil is first conveyed into the pretreatment reactor, several kinds of certain oxidants are added, concentrations of several kinds of pollutants after pretreatment are obtained by means of the detection robot, and real-time data output by the pretreatment physical workshop is concentrations of the several kinds of pollutants;

in the bioremediation physical workshop (6), a bio-augmentation compost process is adopted; specifically, a qualified contaminated soil after pretreatment is conveyed from the pretreatment physical workshop to a bioreactor in the bioremediation physical workshop by using a transportation robot; a temperature, humidity and oxygen concentration thereof are configured that composting is performed by means of several kinds of concentrations of microorganisms, so as to degrade an organic matter in the contaminated soil and to obtain concentrations of several kinds of organic matters after augmented composting, wherein real-time data output by the bioremediation physical workshop is the concentrations of the several organic matters;

the water gas treatment and recovery physical workshop (7) adopt a limestone-gypsum wet desulfurization technology, that is, adopt a liquid absorbent to wash flue gases, so as to absorb $SO_2$; an exhaust gas generated in the bioremediation workshop reaches the water gas treatment and recovery physical workshop; in the exhaust gas treatment and circulation system, an amount of the exhaust gas in an absorption tower, a slurry spraying amount, an oxidation air flow, a slurry density, an ambient temperature, an ambient pressure and a PH value of a circulating slurry are configured; and a discharge concentration of $SO_2$ is obtained, wherein real-time data output from the physical workshop of water gas treatment and recovery is the discharge concentration of $SO_2$.

7. The virtual simulation manufacturing platform based on automatic control according to claim 2, wherein, the virtual simulation system (3) transmits received workshop output data to the signal feedback system, and the signal feedback system (4) compares the output data with the rule data in the user database to determine whether the output data is qualified; if the detection result is not qualified, parameter optimization on the corresponding process is performed, so as to find an optimal parameter; the corresponding physical workshop is accurately positioned by means of the integrated control system, thereby providing timely and effective feedback and re-configuring the parameter on the unqualified physical workshop; and if the detection result is qualified, the next process flow is performed until all the process flows are completed.

8. The virtual simulation manufacturing platform based on automatic control according to claim 5, wherein,
a method for bioremediation augmentation by using the platform comprises the following steps:
step 1, constructing a virtual simulation manufacturing platform based on automatic control; transmitting, by the virtual simulation system (3), the signal received from the process treatment system (2) to the signal feedback system (4) for performing measurement on the process product, receiving, by the integrated control system (1), the determination result provided by the signal feedback system (4); and sending the indication command to the process treatment system (2) for controlling each process flow;
step 2, according to the process flows and automation degree of bioremediation of the contaminated soil, designing the process flows and the process method and storing the process flows and the process method in the user database (11);
step 3, according to the process method designed in step 2, configuring process parameters required by each process and storing the process parameters in the user database (11);
step 4, applying the process parameters selected in step 3 to the corresponding physical workshop in the process treatment system (2); after a process is completed according to the process flows, detecting process output data of the physical workshop by using a detection robot; and transmitting the output data to the signal feedback system (4);
step 5, in the signal feedback system (4), comparing the output data with rule data in the user database (11) to determine whether the output data is qualified; if the output data is not qualified, performing parameter optimization on a corresponding process; accurately positioning the corresponding physical workshop by means of the integrated control system (1), thereby providing timely and effective feedback; repeating step 3, inputting the optimized process parameters, performing a new round of process production test; and if the output data is qualified, proceeding to the next process until all the process flows are completed; and
step 6, after all the process flows, that is, pretreatment, bioremediation, exhaust gas treatment and circulation are completed, measuring the process product; if the process product satisfies the requirement, determining that the process product passes a test, and finishing the process; if the process product fails to pass the test, performing parameter optimization and repeating step 5 until the process product satisfying the requirements is obtained.

9. The virtual simulation manufacturing platform based on automatic control according to claim 8, wherein,
in step 1, when the physical workshop and the virtual workshop are connected, a non-uniform discrimination guide type twinning model is established, and specific operation steps thereof are as follows:
step 11, establishing a digital twinning five-dimensional model architecture, wherein the model architecture comprises five modules, which respectively are: a physical layer module, a twinning layer module, a multi-perception layer module, a database layer module and a manipulation layer module; and taking Thing-Worx industrial Internet of Things platform as a system service platform to establish a virtual simulation manufacturing platform based on automatic control on the basis of digital twinning;
step 12: establishing a model; using Q0 calculated in a first frame as supervision information, and introducing a discriminative model $\delta$ that can be learned online to obtain a new scoring formula as follows:

$$f(x_i, Q_i; \theta, s) = (b(s * Q_i) * \mu(x_i)) \quad (1)$$

wherein $Q_i = \mu(z_i)$; $\theta$ is a set of parameters trained offline, which do not change during tracking; $\mu(\cdot)$ is a feature extractor trained offline; b is an activation function; s is the weight of online discrimination model $\delta$; and * indicates the mapping obtained by means of performing a convolution operation;
step 13: calculating a KL divergence matrix $D_{kl}$ between different network parameter distributions by using the strategy of managing $\delta j$, by the KL divergence between $\delta j$ network parameters $Sj$ of the discriminative model obtained at different times, as shown in the following formula:

$$D_{kl}^{(m,n)}(P(s_m)|P(s_n)) = \sum_{i=1}^{N} P(x_i) \log\left(\frac{P(x_i)}{q(x_i)}\right) \quad (2)$$

$P(s_m), P(s_n) \in R_{1 \times N}$ are corresponding probability distribution of $s_m$ and $s_n$; (m, n) indicates the element at the m-th row and the n-th column in $D_{kl}$;
step 14: for a new $\delta_i$ obtained in each frame, calculating a KL divergence vector dt with an existing networks thereof; finding $\delta_k$, $k \in$ a corresponding to the minimum KL divergence distance, and a distance $d_t(m)$ thereof, and using the strategy f shown in formula (3) to update a discriminative module;

$$f = \begin{cases} V(k) = \delta_i, & \text{if } d_t(i) > \min(D_{kl}) \\ none, & others \end{cases} \quad (3)$$

$V_i$ is a score response diagram of the current moment i; allowing $\widehat{Qi} = \delta(Qi) = b(s * Qi)$, a loss function of similarity calculation for online updating is constructed as shown in formula (4):

$$Lup(s) = \sum_{j=i-n}^{i} \gamma_j (\hat{Q}_j - Q_0)^2 + \lambda \|s\|_2 \quad (4)$$

$\mu \cdot \mu_2$ is L2 norm, regularizing the weight s of a neural network; $\lambda$ is a regularization coefficient; and n is the number of samples;

$$\gamma_j = \frac{1}{E} \beta^{i-j}, \quad E = \sum_{j=i-n}^{i} \beta^{i-j}$$

indicates the jth sample weight; and $0<\alpha<1$ indicates an attenuation parameter of the sample weight; and step 15: designing an online update strategy, wherein the objective of optimization is to find a suitable Δs to minimize $\widehat{L_{up}}(s)$.

\* \* \* \* \*